(12) United States Patent
Yano et al.

(10) Patent No.: US 6,226,002 B1
(45) Date of Patent: May 1, 2001

(54) APPARATUS AND METHOD OF DISPLAYING PSEUDO-THREE-DIMENSIONAL IMAGE AND MACHINE-READABLE RECORDING MEDIUM WITH RECORDED COMPUTER PROGRAM

(75) Inventors: Haruo Yano; Tetsuya Wada, both of Hyogo-ken (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/019,231

(22) Filed: Feb. 5, 1998

(30) Foreign Application Priority Data

Feb. 18, 1997 (JP) .................................................. 9-048572

(51) Int. Cl.$^7$ ..................................................... G06F 15/00
(52) U.S. Cl. ............................................................. 345/419
(58) Field of Search ..................................... 345/339, 418, 345/419, 433, 435, 114, 115

(56) References Cited

U.S. PATENT DOCUMENTS 5,874,956 * 2/1999 LaHood ................................ 345/339

* cited by examiner

Primary Examiner—Phu K. Nguyen
(74) Attorney, Agent, or Firm—Jordan and Hamburg LLP

(57) ABSTRACT

A pseudo-three-dimensional image displaying apparatus displays a pseudo-three-dimensional image, as viewed from a given viewpoint, of a moving object whose three-dimensional coordinates and rotational angles have been established. The pseudo-three-dimensional image displaying apparatus has a memory for storing a history of coordinates and/or rotation angles of the moving object, a viewpoint calculator for determining coordinates and/or rotation angles of the viewpoint based on the history, stored in the memory, of coordinates and/or rotation angles of the moving object, and a data calculator for generating and displaying an image as viewed from the viewpoint at the coordinates and/or rotation angles determined by the viewpoint calculator.

19 Claims, 8 Drawing Sheets

WORLD COORDINATE SYSTEM

LOCAL COORDINATE SYSTEM

APPARATUS AND METHOD OF DISPLAYING PSEUDO-THREE-DIMENSIONAL IMAGE AND MACHINE-READABLE RECORDING MEDIUM WITH RECORDED COMPUTER PROGRAM

BACKGROUND OF THE INVENTION

1. Field of the Invention

The present invention relates to an apparatus for and a method of displaying a pseudo-three-dimensional image, as viewed from a certain viewpoint, of a moving object whose three-dimensional coordinates and rotational angles have been established, such as a game character in a displayed video game image, and a machine-readable recording medium which stores a computer program for displaying such a pseudo-three-dimensional image.

2. Description of the Prior Art

There have heretofore been known pseudo-three-dimensional image displaying apparatus for displaying and controlling a moving object such as a game character in a displayed video image depending on control actions made by a game player, and game apparatus including such pseudo-three-dimensional image displaying apparatus. Recent years have seen game apparatus which incorporate the advanced computer graphics technology for storing all data of moving objects, scenes, and obstacles as polygon data, and displaying images including such moving objects, scenes, and obstacles as viewed from a certain viewpoint in a certain direction. Polygon data normally have at least three-dimensional coordinates corresponding to the vertexes of polygons, and moving objects, etc. are actually three-dimensional objects. Since, however, display units such as CRTs or the like for displaying video images have a two-dimensional display screen, the display units display images of such moving objects, etc. as viewed from a certain viewpoint as images that are projected onto such a two-dimensional display screen, i.e., pseudo-three-dimensional images which look pseudo-three-dimensionally on the two-dimensional display screen.

Viewpoints from which game images are viewed vary depending on the contents of video games played on video game apparatus. For example, in a video game in which the game player moves a displayed character along a certain path, such as a driving video game, the viewpoint is fixedly established along the direction in which the character moves and behind the character. In video games in which the game player can move a character relatively freely in a given field, such as martial-arts games, sports games, etc., the viewpoint is fixed at a distance position from which the character as it moves can be observed or at a position from which the character as it moves can be followed, as if viewed from a television camera viewpoint.

In the conventional pseudo-three-dimensional image displaying apparatus, the viewpoint from and the direction in which a moving object such as a character is viewed are established depending on the present position and direction of the moving object. This image viewing principle poses no problem with respect to video games, such as sports games, which will not make the game player feel odd even when the viewpoint of the game player is not the same as the viewpoint in the displayed images. However, in video games, such as driving video games or the like, in which the viewpoint of the game player should preferably be the same as the viewpoint in the displayed images, the game player may feel odd because the viewpoint of the game player may not be the same as the viewpoint in the displayed images according to the above image viewing principle.

Reasons why such a problem occurs will be described below with respect to a driving video game. In the driving video game, a viewpoint may be established in some instances to reproduce a scene as viewed from the driver in a car on the display screen. In such a case, the viewpoint is usually established in order to view a front scene from a certain position in the car through the front windshield of the car. Insofar as the car is running at a constant speed in a fixed direction, the field of view of the driver is substantially the same as the field of the image that is being displayed on the display screen. However, when the car driven by the driver makes a turn, the driver is swung laterally under centrifugal forces, and its position relative to the car changes, resulting in a possible discrepancy between the field of view of the driver and the field of the image that is being displayed on the display screen.

One solution would be to simulate forces acting on characters, i.e., the car and the driver, and calculate a viewpoint from and a direction in which a front scene is to be viewed depending on the calculated forces. However, if a strict simulation process is to be carried out to establish an accurate viewpoint, then the number of parameters to be taken into account will be greatly increased and the time required to calculate the forces will also be greatly increased, making it difficult to effect real-time simulation processing. In the driving game, since the car (character) basically moves in a two-dimensional plane, behaviors of the character can physically (dynamically) be simulated relatively easily. However, character behaviors cannot accurately be simulated for video games which employ characters such as airplanes that move freely three-dimensionally in midair.

SUMMARY OF THE INVENTION

It is therefore an object of the present invention to provide an apparatus for and a method of displaying a pseudo-three-dimensional image by easily simulating a viewpoint from and a direction in which the image is viewed, depending on the orientation of a player.

Another object of the present invention is to provide a machine-readable recording medium which stores a computer program for displaying such a pseudo-three-dimensional image.

According to an aspect of the present invention, there is provided an apparatus for displaying a pseudo-three-dimensional image, as viewed from a given viewpoint, of a moving object whose three-dimensional coordinates and rotational angles have been established. The apparatus includes first memory means for storing a history of coordinates and/or rotation angles of the moving object, viewpoint determining means for determining coordinates and/or rotation angles of the viewpoint based on the history, stored in the first memory means, of coordinates and/or rotation angles of the moving object, and display control means for generating and displaying an image as viewed from the viewpoint at the coordinates and/or rotation angles determined by the viewpoint determining means. The first memory means stores a history of coordinates and/or rotation angles of the moving object, and the viewpoint determining means determines coordinates and/or rotation angles of the viewpoint based on the history, stored in the first memory means, of coordinates and/or rotation angles of the moving object. The display control means generates and displays an image as viewed from the viewpoint at the coordinates and/or rotation angles determined by the viewpoint determining means.

The apparatus may further comprise second memory means for storing a history of coordinates and/or rotation angles of the viewpoint, and the viewpoint determining means may comprise means for determining coordinates and/or rotation angles of the viewpoint also based on the history, stored in the second memory means, of coordinates and/or rotation angles of the viewpoint. The second memory means stores a history of coordinates and/or rotation angles of the viewpoint, and the viewpoint determining means determines coordinates and/or rotation angles of the viewpoint also based on the history, stored in the second memory means, of coordinates and/or rotation angles of the viewpoint.

The apparatus may further comprise speed calculating means for calculating a speed of the moving object, and the viewpoint determining means may comprise means for determining coordinates and/or rotation angles of the viewpoint also based on the speed of the moving object calculated by the speed calculating means. The speed calculating means calculates a speed of the moving object, and the viewpoint determining means determines coordinates and/or rotation angles of the viewpoint also based on the speed of the moving object calculated by the speed calculating means.

The moving object may moves over terrain whose three-dimensional coordinates have been established. The apparatus may further have gradient calculating means for calculating a gradient of the terrain below the moving object, and the viewpoint determining means may comprise means for determining coordinates and/or rotation angles of the viewpoint also based on the gradient calculated by the gradient calculating means. The gradient calculating means calculates a gradient of the terrain below the moving object, and the viewpoint determining means determines coordinates and/or rotation angles of the viewpoint also based on the gradient calculated by the gradient calculating means.

According to another aspect of the present invention, there is provided a method of displaying a pseudo-three-dimensional image, as viewed from a given viewpoint, of a moving object whose three-dimensional coordinates and rotational angles have been established. The method comprises the steps of storing a history of coordinates and/or rotation angles of the moving object, determining coordinates and/or rotation angles of the viewpoint based on the stored history of coordinates and/or rotation angles of the moving object, and generating and displaying an image as viewed from the viewpoint at the determined coordinates and/or rotation angles. A history of coordinates and/or rotation angles of the moving object is stored, and coordinates and/or rotation angles of the viewpoint are determined on the basis of the stored history of coordinates and/or rotation angles of the moving object. An image as viewed from the viewpoint at the determined coordinates and/or rotation angles is generated and displayed.

The method may further comprise the steps of storing a history of coordinates and/or rotation angles of the viewpoint, and determining coordinates and/or rotation angles of the viewpoint also based on the stored history of coordinates and/or rotation angles of the viewpoint. A history of coordinates and/or rotation angles of the viewpoint is stored, and coordinates and/or rotation angles of the viewpoint are determined also on the basis of the stored history of coordinates and/or rotation angles of the viewpoint.

The method may further comprise the steps of calculating a speed of the moving object, and determining coordinates and/or rotation angles of the viewpoint also based on the calculated speed of the moving object. A speed of the moving object is calculated, and coordinates and/or rotation angles of the viewpoint are determined also on the basis of the calculated speed of the moving object.

The moving object may move over terrain whose three-dimensional coordinates have been established. The method may further comprise the steps of calculating a gradient of the terrain below the moving object, and determining coordinates and/or rotation angles of the viewpoint also based on the calculated gradient. A gradient of the terrain below the moving object is calculated, and coordinates and/or rotation angles of the viewpoint are determined also on the basis of the calculated gradient.

According to still another aspect of the present invention, there is provided a machine-readable recording medium which stores a computer program for controlling a computer to execute a process of displaying a pseudo-three-dimensional image, as viewed from a given viewpoint, of a moving object whose three-dimensional coordinates and rotational angles have been established. The computer program comprises the steps of storing a history of coordinates and/or rotation angles of the moving object, determining coordinates and/or rotation angles of the viewpoint based on the stored history of coordinates and/or rotation angles of the moving object, and generating and displaying an image as viewed from the viewpoint at the determined coordinates and/or rotation angles. The computer is controlled by the computer program to store a history of coordinates and/or rotation angles of the moving object, then determine coordinates and/or rotation angles of the viewpoint based on the stored history of coordinates and/or rotation angles of the moving object, and generate and display an image as viewed from the viewpoint at the determined coordinates and/or rotation angles.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
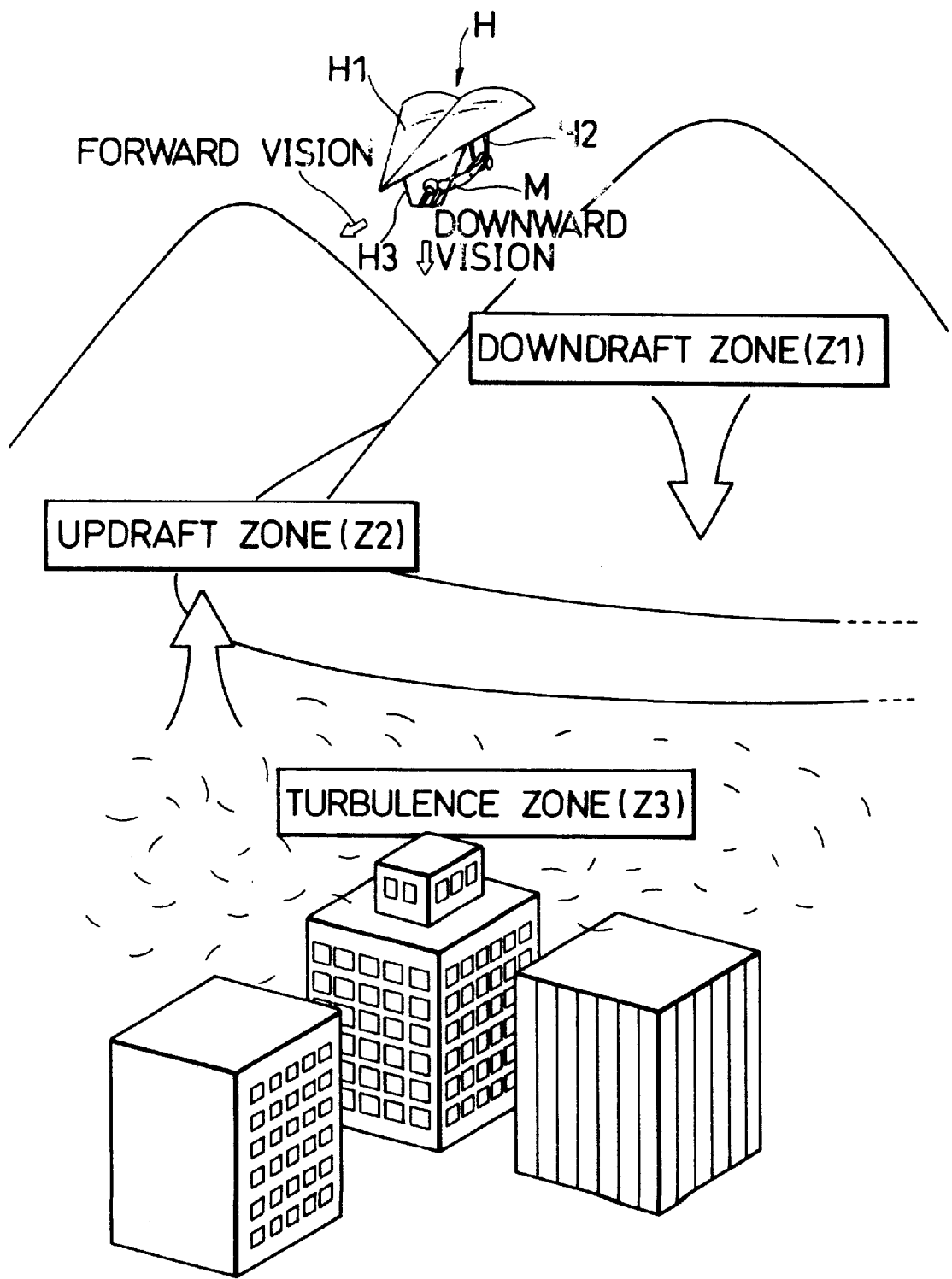
FIG. 1 is a schematic perspective view showing a flight environment that can be simulated in a flight simulation game which is played on a flight simulation game apparatus which incorporates a pseudo-three-dimensional image displaying apparatus according to the present invention.

As shown in FIG. 1, a flight simulation game apparatus 1 (see FIG. 2) which incorporates a pseudo-three-dimensional image displaying apparatus according to the present invention simulates a hang glider H as a flight vehicle to enable a game player to experience physical sensations of flight in midair in a flight simulation game. The hang glider H is in the shape of an isosceles triangle as viewed in plan, and has a lightweight metal frame and a triangular wing H1 of cloth which is attached to the lightweight metal frame.

The hang glider H also has a hanger H2 for supporting a pilot M, the hanger H2 being connected to and extending downwardly from a central portion of the lightweight metal frame. The hang glider H further includes a horizontal control lever H3 connected to and extending downwardly from a front portion of the lightweight metal frame. The pilot M suspended by the hanger H2 moves the control lever H3 horizontally in one direction or the other to turn the hang glider H to the left or right. The pilot M can also change the direction of the hang glider H or lift or lower the hang glider H by shifting the body weight through the hanger H2.

As shown in FIG. 1, an actual flight environment includes an updraft zone Z1, a downdraft zone Z2, and a turbulence zone Z3. The hang glider H in flight is lifted when it enters the updraft zone Z1 and lowered when it enters the downdraft zone Z2, and becomes unstable when it enters the turbulence zone Z3. While in flight in the flight environment, the pilot M controls the control lever H3 to fly over a plain and a river, avoid a mountain, and maneuver the hang glider H in the turbulence zone Z3 with flying techniques for thereby enjoying soaring experiences.

The flight simulation game apparatus 1 enables the game player to experience and enjoy the simulated flight of the hang glider H. The flight simulation game apparatus 1 is arranged to hold the game player in an attitude which simulates the suspended position of the pilot M on the hanger H2, and also to display three-dimensional images of forward and downward scenes as viewed in the directions indicated by the arrows. The displayed three-dimensional images change as the game player make control actions in a manner similar to actual control actions, so that the game player can gain simulated visual flight experiences similar to actual visual flight experiences.

The flight simulation game apparatus 1 will be described in detail below with reference to FIGS. 2 through 4.

Figure 2:
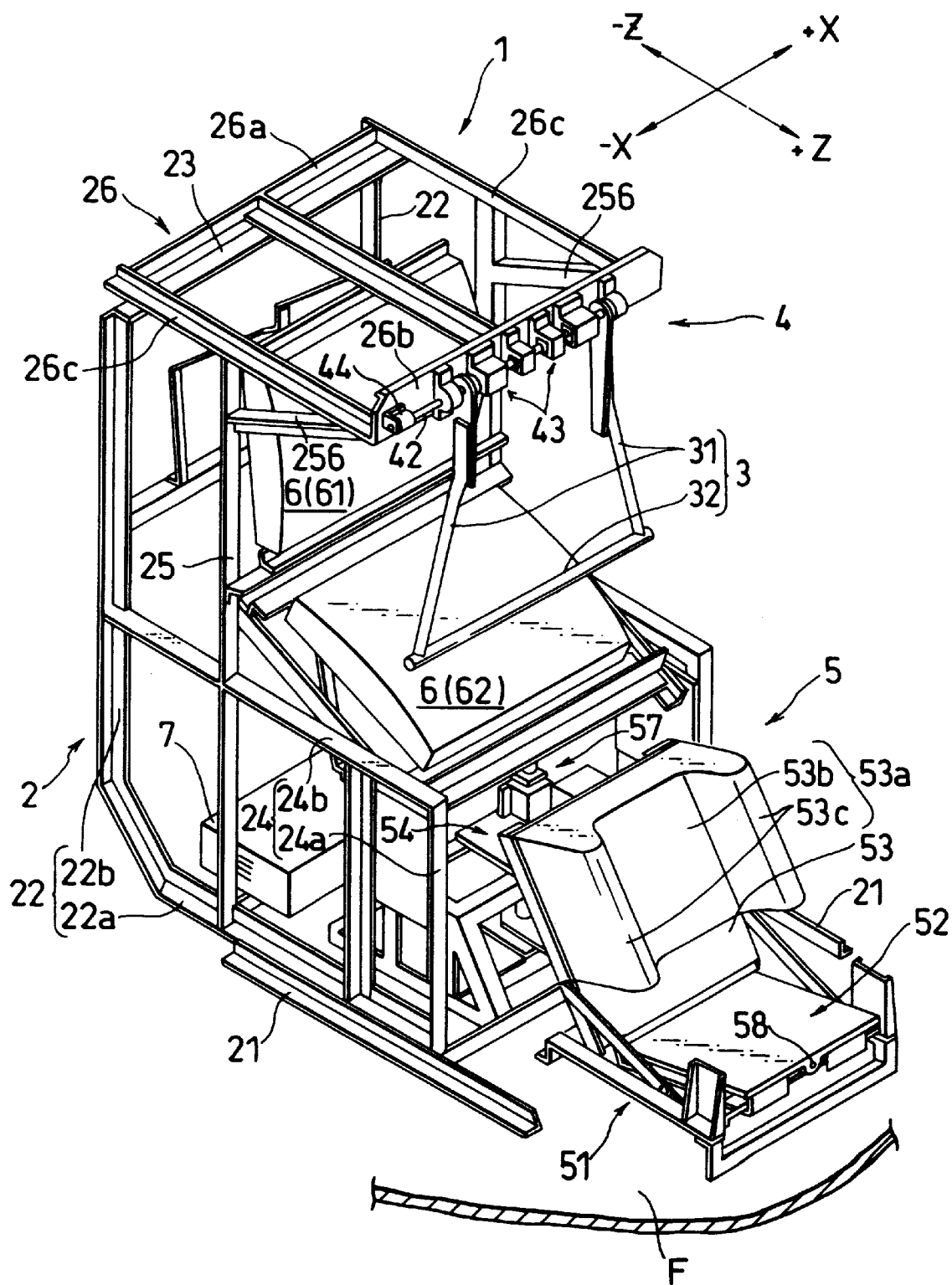
FIG. 2 is a perspective view of an internal structure of the flight simulation game apparatus.

FIG. 2 shows an internal structure of the flight simulation game apparatus 1, which incorporates a control lever moving mechanism 4 according to a first embodiment of the present invention. Principal directions with respect to the internal structure of the flight simulation game apparatus 1 will hereinafter be referred to as transverse directions indicated by the arrows +X, −X and longitudinal directions indicated by the arrows +Z, −Z in FIG. 2. Particularly, the direction indicated by the arrow −X will be referred to as a leftward direction, the direction indicated by the arrow +X as a rightward direction, the direction indicated by the arrow −Z as a forward direction, and the direction indicated by the arrow +Z as a backward direction.

The flight simulation game apparatus 1 comprises a framework 2 made up of a three-dimensional assembly of angles, a control lever 3 mounted on a rear end of an upper portion of the framework 2, a control lever moving mechanism 4 on which the control lever 3 is supported for movement in the longitudinal directions, a body holder 5 for holding the legs of a game player, the body holder 5 being positioned on a rear end of a lower portion of the framework 2, a display monitor 6 for displaying images of simulated scenes while in flight, and a control system (display control means) 7 having a microcomputer for scrolling displayed images on the display monitor 6.

The term "scrolling" is used herein to mean continuous movement through three-dimensional images of scenes displayed by the display monitor 6 during simulated flight based on control actions on the control lever 3.

The framework 2 has a pair of transversely spaced base frames 21 installed in a floor F and a pair of transversely spaced L-shaped frames 22 supported respectively on the base frames 21. Each of the L-shaped frames 22 comprises a horizontal bar 22a fixed to one of the base frames 21 and a vertical bar 22b extending vertically from an end of the horizontal bar 22a remotely from the base frame 21. The vertical bars 22b of the L-shaped frames 22 have respective upper ends interconnected by an upper front horizontal bar 23.

Rear ends of the horizontal bars 22a and intermediate portions of the vertical bars 22b are interconnected by a pair of transversely spaced intermediate frames 24 each comprising a vertical bar 24a and a horizontal bar 24b. The horizontal bars 24b, whose rear ends are joined to respective upper ends of the vertical bars 24a, are joined to respective transversely spaced upstanding frames 25 which have respective lower ends connected to the respective horizontal bars 22a near front ends thereof.

The upstanding frames 25 have respective upper ends positioned at substantially the same height as the upper front horizontal bar 23. The upper ends of the upstanding frames 25 and the upper front horizontal bar 23 support thereon a substantially square frame 26 which comprises a front transverse horizontal bar 26a, a rear transverse control lever support plate 26b spaced longitudinally from the front transverse horizontal bar 26a, and a pair of transversely spaced, longitudinal joint bars 26c extending between and interconnecting the ends of the front transverse horizontal bar 26a and the rear transverse control lever support plate 26b. The rear ends of the joint bars 26c are connected to the upstanding frames 25 by diagonal bracings 256. Accordingly, the substantially square frame 26 is stably supported on the upstanding frames 25 and the upper front horizontal bar 23 with the aid of the diagonal bracings 256.

The control lever 3, the control lever moving mechanism 4, the body holder 5, the display monitor 6, and the control system 7 are supported on the framework 2 of the above structure as described in detail below.

The control lever 3 is attached to the control lever support plate 26b through the control lever moving mechanism 4 for movement in the longitudinal directions. The control lever 3 is basically of a U shape that slightly spreads downwardly as viewed in the forward direction −Z from the body holder 5. Specifically, the control lever 3 comprises a pair of transversely spaced vertical rods 31 extending downwardly from opposite sides of the control lever moving mechanism 4 and progressively spreading away from each other, and a horizontal grip rod 32 extending between and connected to lower ends of the vertical rods 31. The game player grips the grip rod 32 with both hands and moves the grip rod 32 in the longitudinal directions −Z, +Z to make control actions for playing the flight simulation game.

Figure 3A:
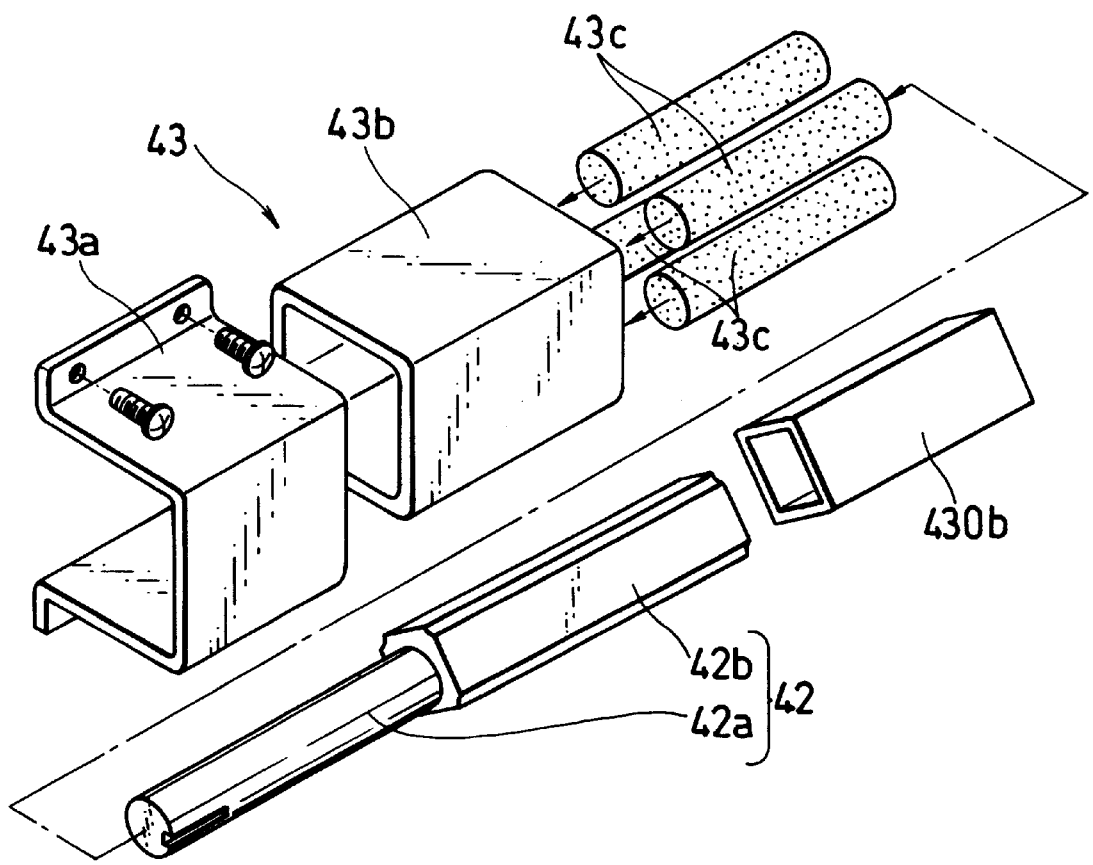
FIG. 3A is an exploded fragmentary perspective view of a biasing structure of the flight simulation game apparatus.
Figure 3B:
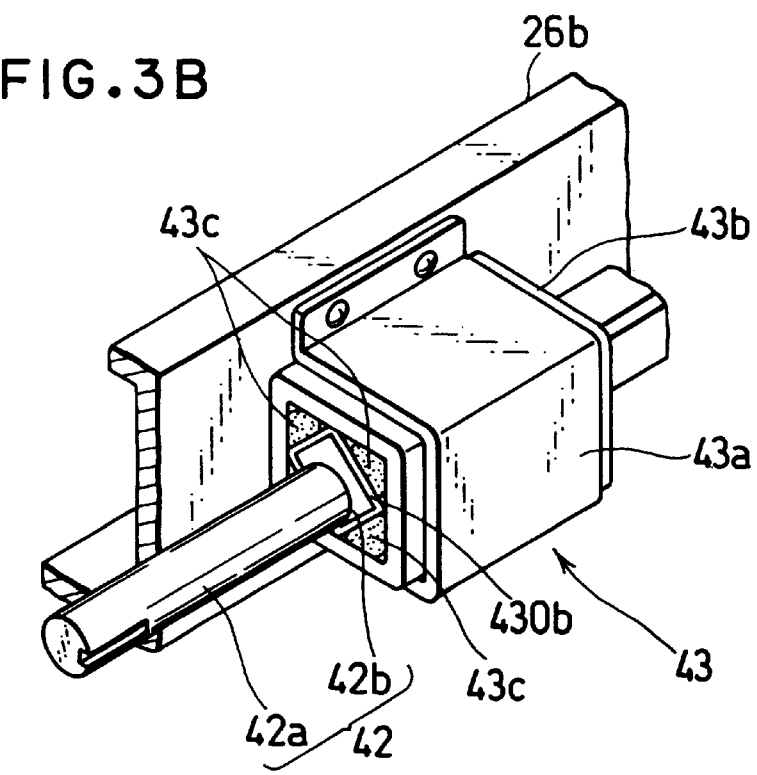
FIG. 3B is a fragmentary perspective view of the biasing structure.

The control lever moving mechanism 4 comprises a pair of transversely spaced bearings 41 mounted on the control lever support plate 26b, a horizontal shaft 42 rotatably supported by the bearings 41 for angular movement about its own axis, a plurality of biasing structures 43 mounted on the control lever support plate 26b and spaced along the horizontal shaft 42 between the bearings 41, for imparting resistive or biasing forces to the horizontal shaft 42 against angular movement thereof, and an angular displacement sensor 44 mounted on the control lever support plate 26b and connected coaxially to a left end of the horizontal shaft 42 for detecting an angular displacement of the horizontal shaft 42. As shown in FIGS. 3A and 3B, the horizontal shaft 42 comprises a pair of cylindrical rods 42a (only one shown) rotatably supported by the bearings 41 and a prismatic rod 42b extending between the cylindrical rods 42a. The vertical rods 31 of the control lever 3 have respective upper ends fixed to the horizontal shaft 42 near the respective bearings 41 so that the horizontal shaft 42 can be angularly moved about its own axis when the control lever 3 is moved in the longitudinal directions −Z, +Z by the game player.

One of the biasing structures 43 is shown in detail in FIGS. 3A and 3B. Since the biasing structures 43 are identical to each other, only the biasing structure 43 shown in FIGS. 3A and 3B will be described below. The biasing structure 43 is constructed such that it generates recovery forces against an applied angular displacement at a rate that increases in proportion to the displacement from a reference position. Specifically, the biasing structure 43 comprises a channel-shaped bracket 43a fixed to the control lever support plate 26b, an outer tube 43b of rectangular cross section housed in the bracket 43a, an inner tube 430b of rectangular cross section fitted in the outer tube 43b, and four cylindrical rubber recovery members 43c interposed between the outer tube 43b and the inner tube 430b.

The inner tube 430b has an inner hole defined therein whose dimensions are slightly greater than the dimensions of the prismatic rod 42b. The inner tube 430b and the prismatic rod 42b fitted therein can rotate in unison with each other about the axis of the horizontal shaft 42.

As shown in FIG. 3B, the inner tube 430b placed in the outer tube 43b has its four corners facing the respective sides of the outer tube 43b, leaving four spaces of triangular cross section between the four outer sides of the inner tube 430b and the four corners of the outer tube 43b. The four cylindrical rubber recovery members 43c are positioned respectively in these spaces and held against the respective outer sides of the inner tube 430b. With the prismatic rod 42b fitted in the inner tube 430b, the horizontal shaft 42 is attached to the control lever support plate 26b through the biasing structure 43.

When the game player grips the grip rod 32 (see FIG. 2) and turns the control lever 3 about the axis of the grip rod 32, the prismatic rod 42b and hence the inner tube 430b elastically deforms the rubber recovery members 43c, which store resilient recovery forces. When the game player releases the grip rod 32, the control lever 3 automatically returns to its original position under the resilient recovery forces stored in the rubber recovery members 43c, which now recover their original shape.

Unlike ordinary helical springs, the biasing structure 43 imparts recovery forces that are relatively small when the angular displacement of the horizontal shaft 42 about its own axis is small, but increase quadratically as the horizontal shaft 42 increases the angular displacement about its own axis. Such quadratically variable recovery forces generated by the biasing structure 43 give the hands of the game player responses similar to those which will actually be experienced by the pilot of a hang glider that is in actual flight.

Figure 4:
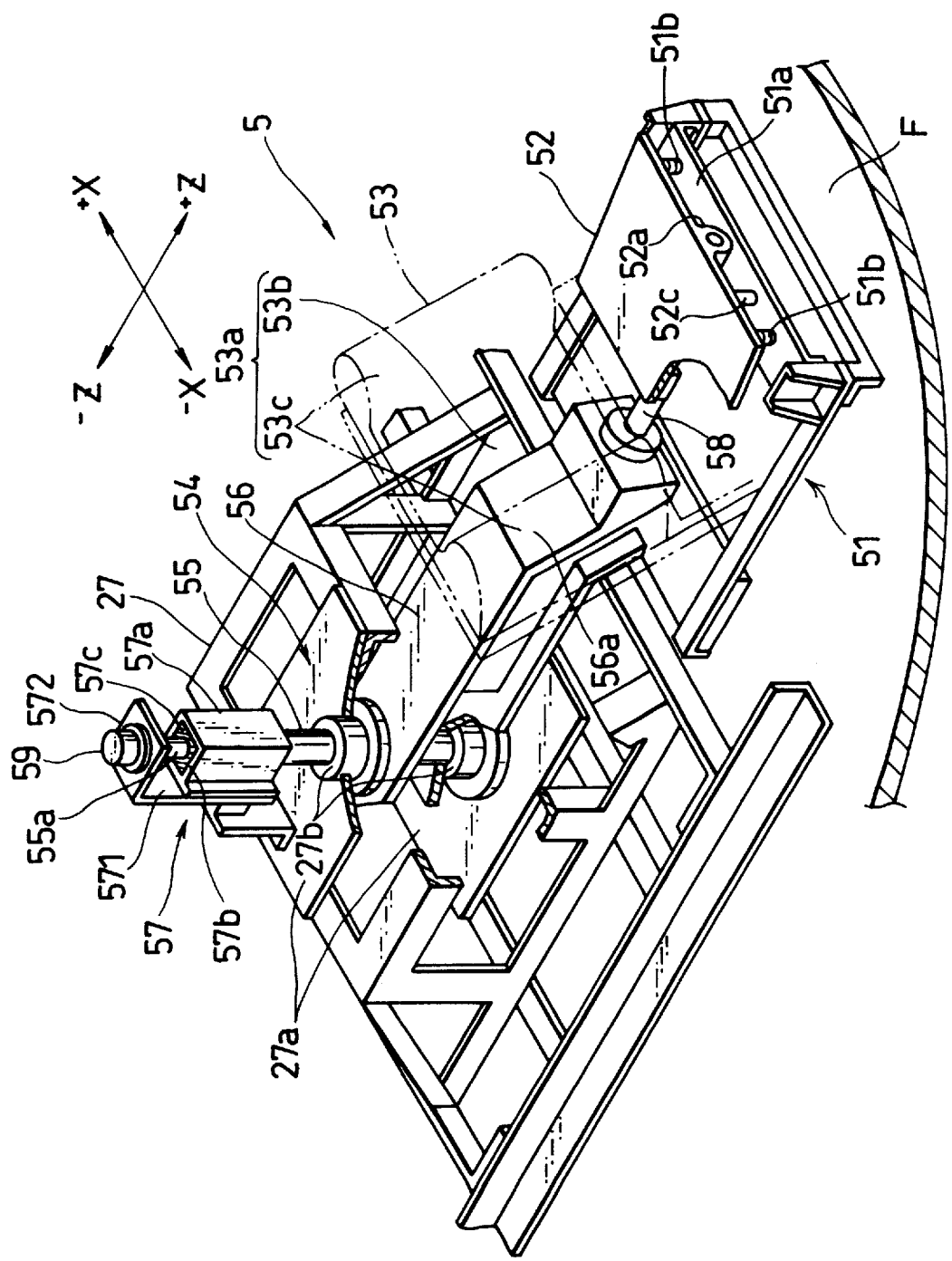
FIG. 4 is a fragmentary perspective view of a body holder of the flight simulation game apparatus.

FIG. 4 shows the body holder 5 in detail. As shown in FIG. 4, the body holder 5 comprises a body holder frame 51, a leg rest 52 and a thigh support 53 which are mounted on the body holder frame 51, and a body holder moving mechanism 54 for moving the body holder frame 51 in the transverse directions −X, +X.

The body holder frame 51 is of a rectangular shape as viewed in plan, and is positioned behind the lower portion of the framework 2 and has its bottom spaced upwardly from the floor F. The leg rest 52 is in the form of a flat plate disposed on a rear portion of the body holder frame 51 and has its general plane inclined at a small angle downwardly in the forward direction −Z. The thigh support 53 is positioned in front of the leg rest 52 and inclined upwardly in the forward direction −Z. The angle at which the leg rest 52 is inclined to the horizontal plane is selected such that the game player on the body holder 5 has its body tilted forwardly, and the angle at which the thigh support 53 is inclined to the horizontal plane is selected such that the forwardly tilted body of the game player can be borne by the legs of the game player on the leg rest 52.

The thigh support 53 has a rear surface supporting thereon a pad 53a made of a soft material such as cellular plastic or the like. The pad 53a has a central vertical valley or trough 53b and a pair of side ridges 53c disposed one on each side of the central vertical trough 53b. When the game player is positioned on the body holder 5 with the legs placed on the leg rest 52, the thighs are fitted in the central vertical trough 53b between the side ridges 53c.

The body holder moving mechanism 54 is supported on an inner frame 27 disposed in a front region of the lower portion of the framework 2. The inner frame 27 comprises upper and lower pairs of longitudinally spaced, transverse angles 27c, a pair of vertically spaced, upper and lower support plates 27a mounted on the transverse angles 27c and extending longitudinally therebetween, and a pair of vertically spaced, upper and lower bearings 27b fixedly mounted on the respective support plates 27a in concentric relation to each other.

The body holder moving mechanism 54 comprises a vertical shaft 55 rotatably supported on the upper and lower bearings 27b for angular movement about its own axis, a horizontal connector 56 connected at a front end thereof to the vertical shaft 55 between the bearings 27b, and a second biasing structure 57 mounted on an upper end of the vertical shaft 55 which projects upwardly from the upper bearing 27b.

The connector 56 extends rearwardly from the vertical shaft 55 out of the inner frame 27 to a position behind the lower portion of the framework 2. The connector 56 has a slanted rear end 56a inclined downwardly in the backward direction +Z. The body holder frame 51 has a front end fixedly connected to the slanted rear end 56a. Therefore, the body holder frame 51 is angularly movable in the transverse directions −X, +X within a predetermined angular range about the vertical shaft 55.

The second biasing structure 57 is basically identical to the biasing structure 43. The second biasing structure 57 comprises a bracket 57a attached to an upstanding support plate 571 which is mounted on a front end of the upper support plate 27a parallel to the vertical shaft 55, an outer tube 57b fitted in the bracket 57a, and four cylindrical rubber recovery members 57c mounted in the outer tube 57b.

The vertical shaft 55 has a prismatic rod 55a on its upper end which is fitted in an inner tube, with the four cylindrical rubber recovery members 57c interposed between the inner tube and the outer tube 57b. Therefore, when the vertical shaft 55 is turned about its own axis, the four cylindrical rubber recovery members 57c are elastically deformed, storing recovery forces. When the body holder frame 51 is angularly moved about the vertical shaft 55, the angular movement of the body holder frame 51 is transmitted through the connector 56, the vertical shaft 55, the prismatic rod 55a, and the inner tube to the recovery members 57c, which then store recovery forces tending to resist the angular movement of the body holder frame 51.

An oblique shaft 58, which extends parallel to and below the leg rest 52, is mounted on and extends rearwardly from the slanted rear end 56a of the connector 56. The leg rest 52 supports on its lower surface a bearing 52a fitted over the oblique shaft 58 for allowing the leg rest 52 to be angularly moved about the oblique shaft 58.

The support plate 571 includes a horizontal seat 572 extending horizontally rearwardly from its upper end, and the prismatic rod 55a of the vertical shaft 55 has an upper end projecting upwardly through the horizontal seat 572. A second angular displacement sensor 59 is fixed coaxially to the projecting upper end of the prismatic rod 55a for detecting an angular displacement of the vertical shaft 55 and hence the leg rest 52.

The body holder frame 51 includes a pair of transversely spaced angles 51c mounted on a rear end thereof and a bridge plate 51a extending between and fixed to the angles 51c below the oblique shaft 58. Two transversely spaced helical springs 51b, which can apply the same biasing forces, are interposed between the leg rest 52 and the bridge plate 51a, one on each side of the oblique shaft 58. The helical springs 51b exert resilient biasing forces to normally keep the leg rest 52 in a horizontal attitude. When the game player places more body weight on one of the legs on the leg rest 52, the leg rest 52 is tilted from the horizontal attitude about the oblique shaft 58, depressing its portion under the weighted leg.

Angular displacement sensors 52c are interposed between the leg rest 52 and the bridge plate 51a, one on each side of the oblique shaft 58, for detecting an angular displacement of the leg rest 52.

As shown in FIG. 2, the display monitor 6 comprises a front monitor unit 61 positioned in front of the control lever 3 between the upstanding frames 25 and a lower monitor unit 62 positioned below the control lever 3 and the front monitor unit 61 and between the horizontal bars 24b. The front monitor unit 61 has a monitor screen facing rearwardly and lying substantially vertically. The lower monitor unit 62 has a monitor screen facing upwardly and inclined upwardly in the forward direction −Z. When the game player who has the legs placed the leg rest 52, the thighs on the thigh support 53, and the hands gripping the grip rod 32 directs the line of sight forwardly, the game player can view the monitor screen of the front monitor unit 61. When the game player directs the line of sight downwardly, the game player can view the monitor screen of the lower monitor unit 62.

The control system 7 is positioned in a space that is defined in the rear end of the lower portion of the framework 2. The control system 7 will be described in detail below with reference to FIG. 5.

The control system 7 includes a CPU (central processing unit) 100, a bus 102 comprising address, data, and control buses and connected to the CPU 100, a graphic data generating processor 103 connected to the CPU 100, a main memory 105 connected to the bus 102, a ROM (read-only memory) 106 connected to the bus 102, a polygon data memory 107, a texture data memory 108 connected to the bus 102, a graphic processor 110 connected to the bus 102, a buffer 111 connected to the graphic processor 110, a recording medium driver 113 connected to the bus 102, and D/A (digital-to-analog) converters 114, 115 connected to the bus 102. Rheostats 118, 119 are connected through respective interfaces 116, 117 to the D/A converters 114, 115. The rheostats 118, 119 are incorporated in the angular displacement sensors 44, 59, respectively, and have respective resistances variable depending on the angular displacements detected by the displacement sensors 44, 59. A machine-readable recording medium 120 is connected to the recording medium driver 113. The recording medium 120 stores image data, audio data, and game data including a computer program for controlling the control system 7. Display monitor units 121, 122, which serve as the front and rear monitor units 61, 62, are connected to the graphic processor 110.

The flight simulation game apparatus 1 is constructed as an arcade game machine, and the components of the control system 7 are placed altogether in a single housing. However, the flight simulation game apparatus 1 is not limited to such an arcade game machine, and may have different configurations depending on how it is used. For example, if the flight simulation game apparatus 1 is constructed as a game machine for home use, then the display monitor units 121, 122 are separate from the other parts of the game apparatus itself. If the flight simulation game apparatus 1 is constructed around a personal computer or a work station, then the display monitor units 121, 122 correspond to a display monitor of such a personal computer or a work station, the processors 103, 110 to part of the game data recorded on the recording medium 120 or a hardware arrangement on an expansion board inserted in an expansion slot in the personal computer or the work station, and the buffer 111 to an area of the main memory 105 or an expansion memory (not shown).

The various components shown in FIG. 5 will be described in detail below. The graphic data generating processor 103 serves as a coprocessor of the CPU 100. The graphic data generating processor 103 carries out coordinate transformations, light source calculations, and matrixes and vectors of fixed point by way of parallel processing. Main processing tasks of the graphic data generating processor 103 are coordinate transformations and light source calculations.

According to the coordinate transformations, absolute coordinate data of vertexes in a two- or three-dimensional plane of image data supplied from the CPU 100 are processed to determine addresses of an image in a display area based on linear and angular displacement data, and the determined addresses are returned to the CPU 100. The coordinate transformations will be described in detail later on. According to the light source calculations, the luminance of an image is calculated depending on vector data of light rays, normal data representing the orientation of the surface of a polygon, and data representing the color of the surface.

The main memory 105 comprises a writable/readable storage memory such as a RAM (random-access memory) or the like, for example, and stores game program data, as described later on. The main memory 105 also stores data of linear and angular displacements of objects and a history of linear and angular displacements of the viewpoint. The ROM 106 stores game program data as an operating system for the flight simulation game apparatus 1. The game program data in the ROM 106 correspond to a BIOS (Basic Input Output System) in a personal computer.

The polygon data memory 107 comprises a storage medium such as a ROM or the like, for example, and stores three-dimensional absolute coordinate data of vertexes of many polygons. The polygons are polygonal two-dimensional images which may be of a triangular or rectangular shape in this embodiment. Similarly, the texture data memory 108 comprises a storage medium such as a ROM or the like, and stores texture data and color palette data. The texture data comprise two-dimensional image data, and the color palette data comprise data for indicating colors of the texture data.

The graphic processor 110 effects a graphic processing on data contained in the buffer 111 based on graphic commands issued from the CPU 100. The buffer 111 has a display area and a non-display area. The display area is an area for storing data to be displayed on the display screens of the display monitor units 121, 122, and the non-display area is an area for temporarily storing the texture data, the color palette data, etc. These data are transferred from the polygon data memory 107 and the texture data memory 108 to the non-display area of the buffer 111 by the CPU 100 in one cycle or a plurality of cycles in synchronism with the progress of the video game.

Graphic commands issued from the CPU 100 include, for example, a graphic command for displaying a line, a graphic command for displaying a three-dimensional image using polygons, and a graphic command for displaying an ordinary two-dimensional image.

The graphic command for displaying a line comprises addresses for starting and ending displaying a line, and data representing the color of the line and the displaying of the line. The graphic command for displaying a line is issued from the CPU 100 directly to the graphic processor 110.

The graphic command for displaying a three-dimensional image using polygons comprises polygon vertex address data in the display area of the buffer 111, texture address data indicative of a storage position in the buffer 111 of texture data to be mapped onto polygons, color palette address data indicative of a storage position in the buffer 111 of color palette data representing a color of the texture data, and luminance data indicative of a luminance of the texture data. Of these data, the polygon vertex address data is calculated by the graphic data generating processor 103 based on polygon absolute coordinate data, polygon motion data, and viewpoint motion data from the CPU 100. The manner in which the polygon vertex address data is determined will be described below.

Motion of an object on the display screens of the display monitor units 121, 122 is determined by the movement of the object itself and the movement of a viewpoint with respect to the object. For example, if only the object moves and the viewpoint is fixed, then the motion of the object on the display screens of the display monitor units 121, 122 is the same as the movement of the object itself. Conversely, if the object does not move and only the viewpoint moves, then the motion of the object on the display screens of the display monitor units 121, 122 is the same as the movement of the viewpoint itself. The above explanation can be understood more easily if the term "viewpoint" is replaced with a term "camera position". Therefore, the display screens of the display monitor units 121, 122 display the object thereon as if the object were imaged by a moving camera. While either the object or the viewpoint has been described as moving in the above explanation, the data are processed and displayed as if both the object and the viewpoint were moving.

The motion of the object comprises an angular displacement and a linear displacement. The angular displacement of the object with respect to the viewpoint is generated by rotation angles of the object and the viewpoint. The angular displacement and the rotation angles are expressed by 2×2 matrices in a data processing which uses a two-dimensional coordinate system and 3×3 matrices in a data processing which uses a three-dimensional coordinate system. The linear displacement of the object with respect to the viewpoint is generated by an object position (coordinates), a viewpoint position (coordinates), and a rotation angle of the viewpoint. The rotation angle is expressed by 2×2 matrices in a data processing which uses a two-dimensional coordinate system and 3×3 matrices in a data processing which uses a three-dimensional coordinate system. Rotation angles of the object and the viewpoint based on control actions from the game player as detected by the rheostats 118, 119 are stored in tables. Based on a control action from the game player, the CPU 100 reads corresponding rotation angles of the object and the viewpoint from the tables, and uses the read rotation angles to determine angular and linear displacements of the object with respect to the viewpoint.

Polygon vertex address data in the display area is determined as follows: In response to a control action from the game player, the CPU 100 determines a rotation angle and a position of the object and a rotation angle and a position of the viewpoint. Based on the determined rotation angles of the object and the viewpoint, the CPU 100 determines an angular displacement of the object with respect to the viewpoint. Based on the position of the object and the position and rotation angle of the viewpoint, the CPU 100 determines a linear displacement of the object with respect to the viewpoint. If the angular and linear displacement data of the object are processed using a three-dimensional coordinate system, then they are expressed in 3×3 matrices.

The angular and linear displacement data of the object are supplied together with polygon absolute coordinate data to the graphic data generating processor 103. Based on the supplied angular and linear displacement data of the object, the graphic data generating processor 103 converts the polygon absolute coordinate data to polygon vertex address data. The polygon absolute coordinate data is obtained according to the above process.

The polygon vertex address data represents addresses in the display area of the buffer 111. The graphic processor 110 establishes a triangular or rectangular range in the display area of the buffer 111 which is represented by three or four polygon vertex address data, and writes texture data in the established range. Such a writing process is generally referred to as "texture mapping". The display screens of the display monitor units 121, 122 display an object with texture data mapped onto a number of polygons which the object is constructed of.

The graphic command for displaying an ordinary two-dimensional image comprises vertex address data, texture address data, color palette address data, and luminance data indicative of a luminance of the texture data. Of these data, the vertex address data comprises coordinate data produced when vertex coordinate data in a two-dimensional space from the CPU 100 are transformed by the graphic data generating processor 103 based on linear displacement data from the CPU 100.

The recording medium driver 113 may comprise a hard disk drive, an optical disk drive, a flexible disk drive, a silicon disk drive, a cassette reader, or the like, and the recording medium 120 may comprise a hard disk, an optical disk, a flexible disk, a semiconductor memory, or the like. The recording medium driver 113 reads game program data from the recording medium 120, effects an error-correcting process on the game program data with an ECC (Error-Correcting Code), and supplies the error-corrected game program data to the main memory 105.

The D/A converters 114, 115 read detected voltages from the rheostats 118, 119 incorporated in the angular displacement sensors 44, 59, through the respective interfaces 116, 117 in periodic cycles, and convert the detected voltages into digital data. The digital data produced by the D/A converters 114, 115 represent control actions from the game player.

Basic operation of the flight simulation game apparatus 1 will be described below. Detailed operation of the flight simulation game apparatus 1 will be described later on with reference to a flowchart.

A power supply switch (not shown) of the flight simulation game apparatus 1 is turned on. If the recording medium 120 is inserted in the recording medium driver 113, then the CPU 100 instructs the recording medium driver 113 to read the game data from the recording medium 120 based on the operating system stored in the ROM 106. The recording medium driver 113 then reads the game program data from the recording medium 120, and effects an error-correcting process on the game program data. The error-corrected game program data are supplied to the main memory 105. The CPU 100 then carries out the flight simulation game based on the game program data stored in the main memory 105 and commands entered by the game player, i.e., output signals from the D/A converters 114, 115. Specifically, the CPU 100 controls image processing and internal processing operations based on commands entered by the game player. In the image processing operation, angular and linear displacement data and absolute coordinate data are supplied to the graphic data generating processor 103, and graphic commands including address data and luminance data in the display area of the buffer 111, determined by the graphic data generating processor 103, are issued. In the internal processing operation, calculations are carried out based on commands entered by the game player.

Figure 5:
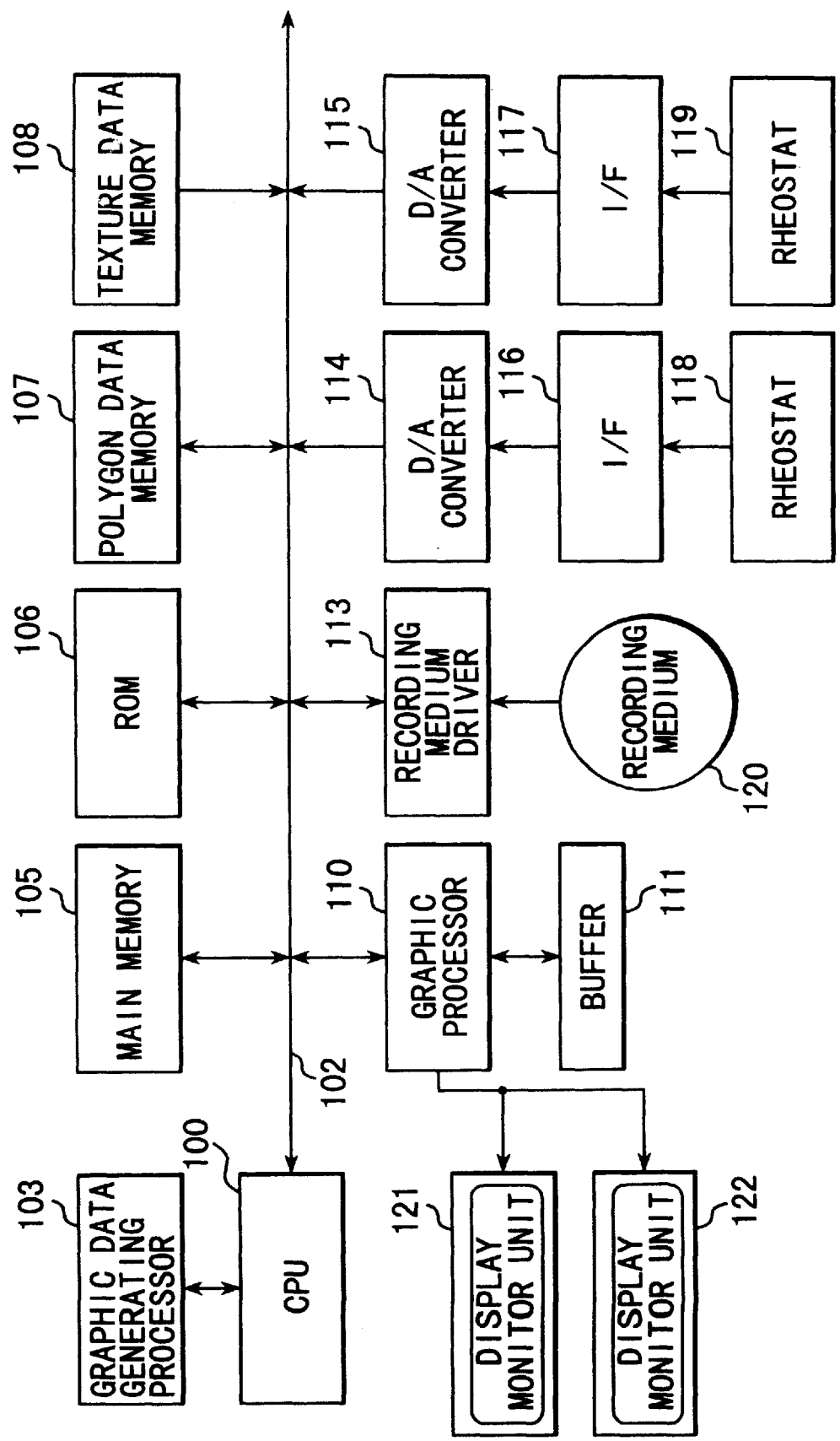
FIG. 5 is a block diagram of a control system of the flight simulation game apparatus.
Figure 6:
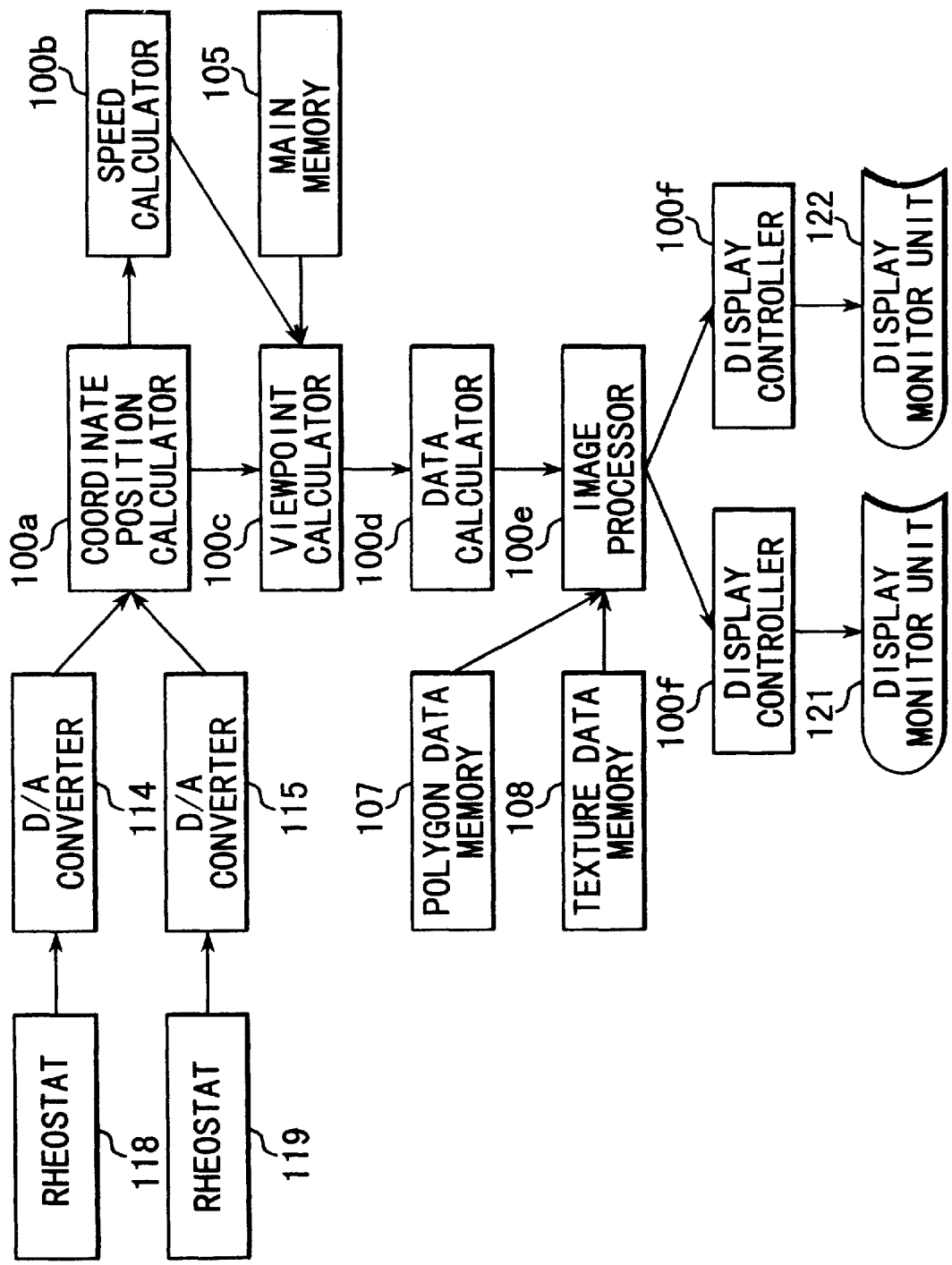
FIG. 6 is a block diagram of functions that are performed by the control system shown in FIG. 5.

FIG. 6 shows in block form functions that are performed by the control system shown in FIG. 5. The CPU 100 performs certain functions shown in FIG. 6 when it reads the game program data which have been read from the recording medium 120 and stored in the main memory 105. As shown in FIG. 5, the functions performed by the CPU 100 include a coordinate position detector 100a, a speed calculator 100b, a viewpoint calculator 100c, a data calculator 100d, an image processor 100e, and a pair of display controllers 100f.

The coordinate position detector 100a calculates, as control actions of the game player, the differences between detected voltages produced by the rheostats 118, 119 when the control lever 3 and the horizontal connector 56 are operated by the game player and reference voltages produced by the rheostats 118, 119 when the vertical rods 31 of the control lever 3 are in the vertical plane and the horizontal connector 56 lies parallel to the longitudinal directions −Z, +Z, and calculates linear and angular displacements of the character from the calculated control actions. The speed calculator 100b determined a speed of movement of the character as a vector, i.e., a quantity having a value and a direction, from the linear and angular displacements calculated by the coordinate position detector 100a.

The viewpoint calculator 100c calculates linear and angular displacements of the viewpoint based on the linear and angular displacements calculated by the coordinate position detector 100a, the speed calculated by the speed calculator 100b, and a history of linear and angular displacements of the character and the viewpoint which are stored in the main memory 105. The data calculator 100d calculates polygon vertex data, etc. based on the linear and angular displacements calculated by the coordinate position detector 100a and the linear and angular displacements calculated by the viewpoint calculator 100c. The image processor 100e produces image data based on the polygon vertex data, etc. calculated by the data calculator 100d. The display controllers 100f control the display monitor units 121, 122 to display an image based on the image data produced by the image processor 100e.

Figure 7:
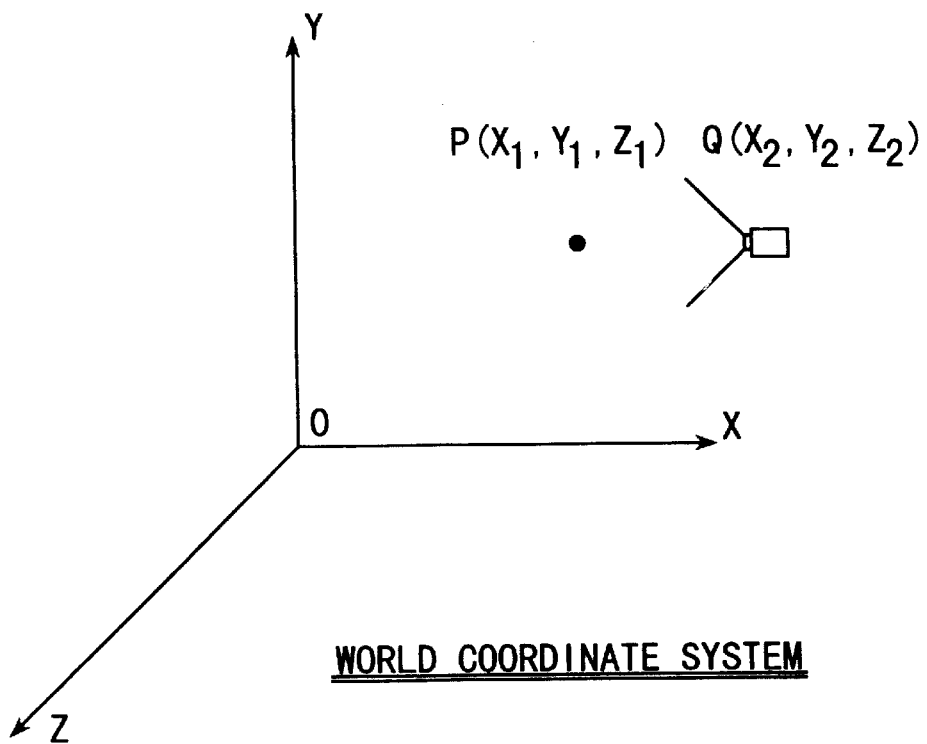
FIGS. 7 and 8 are diagrams illustrative of a process of calculating linear and angular displacements of a viewpoint.
Figure 8:
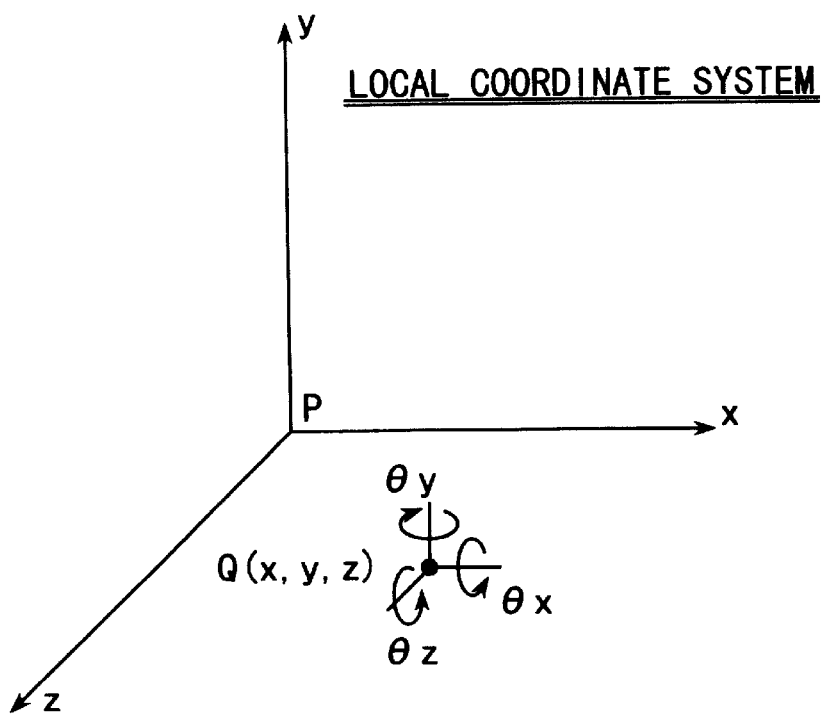

FIGS. 7 and 8 illustrate a process of calculating linear and angular displacements of the viewpoint with the viewpoint calculator 100c.

According to this embodiment, as shown in FIG. 8, the coordinates of a character P are given as absolute coordinates, i.e., coordinates P $(X_1, Y_1, Z_1)$ in a world coordinate system with a fixed origin O, and the coordinates of a viewpoint Q are given as coordinates Q (x, y, z) in a local coordinate system whose origin is located at the position of the character P. Angular displacements of the character P and the viewpoint Q are given as respective angular displacements P $(\Theta_x, \Theta_y, \Theta_z)$, Q $(\theta_x, \theta_y, \theta_z)$ with respect to the world coordinate system. Each of the world and local coordinate systems is a so-called right-handed system which has a +X axis which extends to the right as viewed from the game player, a +Y axis which extends upwardly, and a +Z axis which extends toward the game player.

When the coordinate position detector 100a calculates coordinates, which can be determined immediately from a linear displacement, and an angular displacement of the character, and the speed calculator 100b determines a vector of movement of the character, the viewpoint calculator 100c determines coordinates Q (x, y, z) of the viewpoint according to the following equations (1):

$$\begin{cases} x = -k_1 \cdot \Theta_z \\ y = 0 \\ z = k_2 \cdot |\vec{V}| + k_3 \end{cases} \quad (1)$$

where the vector V represents a speed vector of the character, $k_1$–$k_3$ are positive constants, and $\Theta_z$ is calculated by the following equation (2):

$$\Theta_{zi} = \Theta_{zi-1} + k \times \sin(\omega - \Theta_{zi-1}) \quad (2)$$

where $\Theta_{zi}$ represents a present calculated angular displacement of the character about the Z-axis, $\Theta_{zi-1}$ a preceding calculated angular displacement of the character about the Z-axis, ω an angular displacement of the leg rest 52, and k a positive constant. The equation (2) contains a time lag factor because the hang glider starts turning with a slight time lag after the game player turns the horizontal grip rod 32 of the control lever 3 horizontally laterally due to hang glider handling characteristics.

Visual effects produced by the equations (1) will be described below. The equation x expresses the manner in which centrifugal forces act on the character in the direction in which the character turns, i.e., when the viewpoint is moved depending on $\Theta_z$. Specifically, since the hang glider turns to the left or right when the horizontal grip rod 32 is turned horizontally laterally, the viewpoint is moved laterally based on the angular displacement of the leg rest 52 (corresponding to $\Theta_z$) upon horizontal turning movement of the horizontal grip rod 32. The constant $k_1$ has a negative sign because the centrifugal forces are applied in the direction opposite to the direction in which the character turns. The equation y indicates that the viewpoint is placed directly behind the character in the horizontal direction. The equation z indicates that the viewpoint is placed behind the character for a clear wide view because it is more difficult to control the hang glider as the speed of the character is higher, and that the viewpoint becomes farther from the character as the speed of the character is higher in order to express speed on the displayed image.

Similarly, the angular displacement Q ($\theta_x$, $\theta_y$, $\theta_z$) of the viewpoint Q is given by the following equations (3):

$$\begin{cases} \theta_{xi} = \dfrac{\Theta_X - \theta_{xi-1}}{k_4} \\ \theta_{yi} = \dfrac{\Theta_Y - \theta_{yi-1}}{k_5} \\ \theta_{zi} = \dfrac{\Theta_Z}{k_6} \end{cases} \quad (3)$$

where the suffix i added to each of the components of the angular displacement represents a present calculated value, the suffix i-1 a preceding calculated value, and $k_4$~$k_6$ positive constants.

Visual effects produced by the equations (3) will be described below. The equation $\theta_x$ serves to add a time lag factor, i.e., to give a visual effect to follow the angular displacement of the character. In addition, $\Theta_z$ corresponds to an angle of elevation or depression when the character sees forward in its direction of flight. If the character glides over a steep valley, then the character tends to glide down the surface of valley, and naturally look down. Therefore, the image as viewed from the viewpoint represents the bottom of the valley as viewed from above. The equation $\theta_y$ also serves to add a time lag factor for thereby giving a visual effect to follow the angular displacement of the character. The equation $\theta_z$ represents a tilt of the image as viewed from the viewpoint depending on the angular displacement of the character.

The equations $\theta_x$, $\theta_y$ calculate respective time lag factors from the difference between the angular displacement of the character and the preceding calculated angular displacement of the viewpoint. However, such time lag factors may be calculated from a history of angular displacements of the character, i.e., several angular displacements of the character which have been calculated in the past. The above equations $\theta_x$, $\theta_y$, however, offer an advantage in that they do not need a substantially memory capacity.

After the coordinates Q (x, y, z) of the viewpoint are calculated, the coordinates P ($X_1$, $Y_1$, $Z_1$) of the character are added to the coordinates Q (x, y, z) thereby to determine coordinates Q ($X_2$, $Y_2$, $Z_2$) of the viewpoint in the world coordinate system. Thereafter, the coordinates of the viewpoint are supplied as $-X_2$, $-Y_2$, $-Z_2$ to the data calculator 100d, and the values $-\theta_x$, $-\theta_y$, $-\theta_z$ of the angular displacement are converted into a rotation matrix, which is supplied to the data calculator 100d. The data calculator 100d then calculates polygon vertex data based on the viewpoint.

Figure 9:
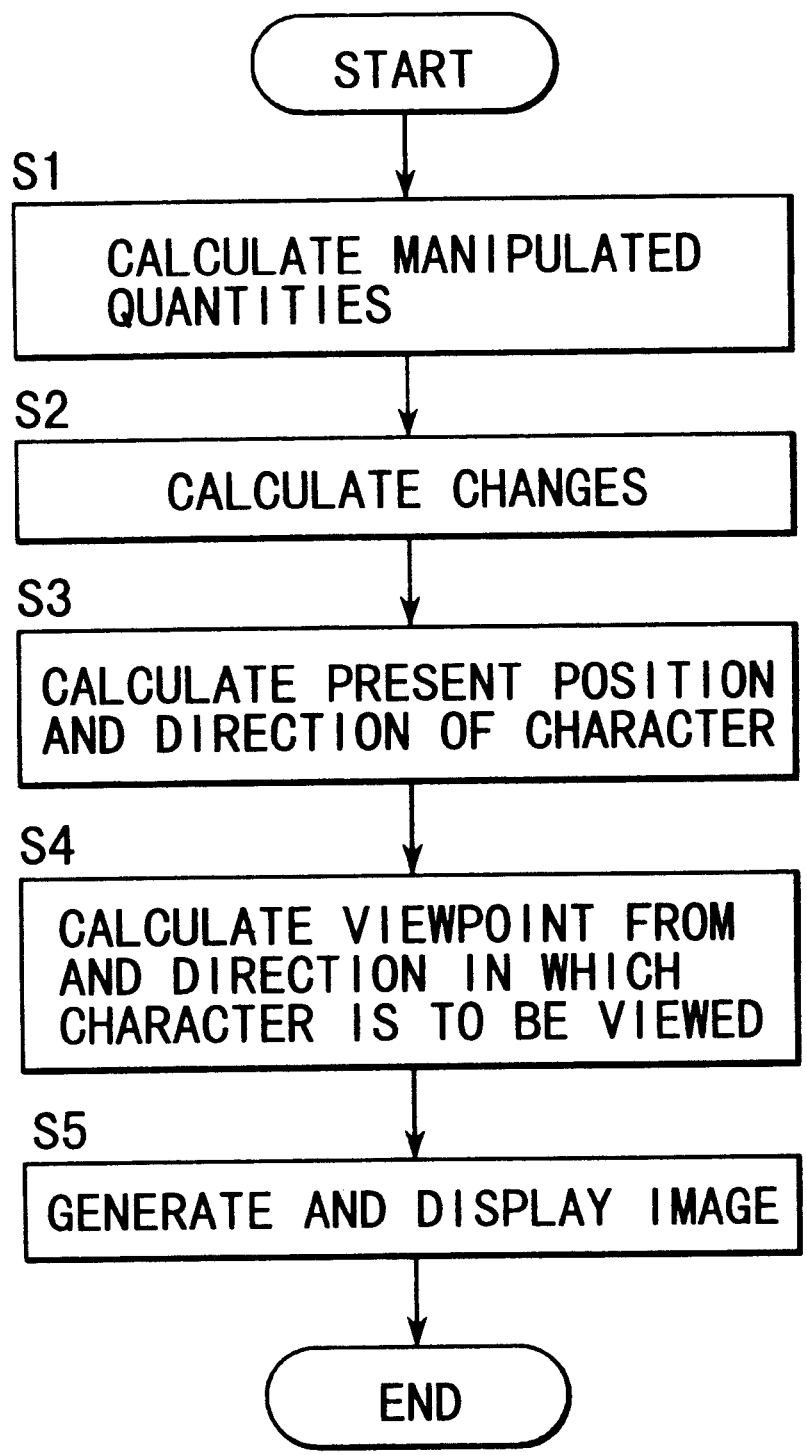
FIG. 9 is a flowchart of an operation sequence of the flight simulation game apparatus.

FIG. 9 shows an operation sequence of the flight simulation game apparatus 1. The operation sequence shown in FIG. 9 is executed in every ⅟60 second. When the power supply switch is turned on, the recording medium driver 113 reads the game program data from the recording medium 120 according to a command from the operating system stored in the ROM 106, and stores the game program data in the main memory 105. The CPU 100 is now capable of performing the functions shown in FIG. 6. The steps of the operation sequence shown in FIG. 9 are carried out as the game program represented by the game program data is executed.

At the same time, texture data are read from the texture data memory 108 and stored in the non-display area of the buffer 111, and are assigned respective texture numbers. Although not all texture data are actually stored in the buffer 111, it is assumed for illustrative purposes that all texture data are stored in the buffer 111.

In a step S1, the CPU 100 calculates two manipulated quantities of the control lever 3 and the leg rest 52 which are produced by control actions made by the game player are calculated on the basis of output signals from the rheostats 118, 119. Then, the CPU 100 calculates changes in the two manipulated quantities in a step S2. In a step S3, the CPU 100 calculates a present position and a present direction of the character based on the changes in the two manipulated quantities which are calculated in the step S2. In a step S4, the CPU 100 calculates a viewpoint from and a direction in which the character is to be viewed, based on the present position and the present direction of the character which are calculated in the step S3. The present position and the present direction of the character, and the viewpoint from and the direction in which the character is to be viewed, thus calculated in the steps S3, S4 are successively stored in the main memory 105. In a step S5, an image is produced and displayed on the basis of the present position and the present direction of the character, and the viewpoint from and the direction in which the character is to be viewed, which have been calculated and stored in the main memory 10.

As described above, the pseudo-three-dimensional image displaying apparatus according to the present invention is capable of simulating the viewpoint from and the direction in which the character is viewed, depending on the orientation, etc. of the game player.

The viewpoint from and the direction in which the character is to be viewed may be calculated in view of parameters other than the coordinates and angular displacements of the character and the viewpoint. For example, the viewpoint from and the direction in which the character is to be viewed may be calculated in view of gradient data of terrain over which the character is flying, such that when the character is gliding over a steep valley, the direction in which the character is to be viewed may be oriented downwardly to view the bottom of the valley from above.

Although a certain preferred embodiment of the present invention has been shown and described in detail, it should be understood that various changes and modifications may be made therein without departing from the scope of the appended claims.

What is claimed is:

1. An apparatus for displaying a pseudo-three-dimensional image of a continuously moving object as viewed from a moving view point, comprising:

first memory means for storing a history of coordinates and/or rotation angles of the continuously moving object;

viewpoint determining means for determining coordinates and/or rotation angles of the moving viewpoint based on the history stored in said first memory means of the coordinates and/or rotation angles of the continuously moving object;

display control means for generating and displaying a pseudo-three-dimensional image of the continuously moving object as viewed from the moving viewpoint when the moving viewpoint is at the coordinates and/or at the rotation angle determined by said viewpoint determining means; and a player-operated unit having an input device for inputting into said viewpoint determining means changes in direction and/or rotational angles of said moving viewpoint such that the display control means substantially simultaneously effects a corresponding change in the generated and displayed image of the continuously moving object.

2. An apparatus according to claim 1, further comprising:

second memory means for storing a history of coordinates and/or rotation angles of the viewpoint;

said viewpoint determining means comprising means for determining coordinates and/or rotation angles of the viewpoint also based on the history, stored in said second memory means, of coordinates and/or rotation angles of the viewpoint.

3. An apparatus according to claim 1 or 2, further comprising:

speed calculating means for calculating a speed of the moving object;

said viewpoint determining means comprising means for determining coordinates and/or rotation angles of the viewpoint also based on the speed of the moving object calculated by said speed calculating means.

4. An apparatus according to claim 1, wherein said moving object moves over terrain whose three-dimensional coordinates have been established, further comprising:

gradient calculating means for calculating a gradient of the terrain below said moving object;

said viewpoint determining means comprising means for determining coordinates and/or rotation angles of the viewpoint also based on the gradient calculated by said gradient calculating means.

5. A method of displaying a pseudo-three-dimensional images of a continuously moving object as viewed from a moving view point comprising the steps of:

storing a history of coordinates and/or rotation angles of the continuously moving object;

determining coordinates and/or rotation angles of the moving viewpoint based on the stored history of the coordinates and/or rotation angles of the continuously moving object;

generating and displaying a pseudo-three-dimensional image of the continuously moving object as viewed from the moving viewpoint when the moving viewpoint is at the determined coordinates and/or at the determinated rotation angle and inputting via a player-operated unit, changes in direction and/or rotational angles of said moving viewpoint into said viewpoint determining means such that the display control means substantially simultaneously effects a corresponding change in the generated and displayed image of the continuously moving object.

6. A method according to claim 5, further comprising the steps of:

storing a history of coordinates and/or rotation angles of the viewpoint; and determining coordinates and/or rotation angles of the viewpoint also based on the stored history of coordinates and/or rotation angles of the viewpoint.

7. A method according to claim 5 or 6, further comprising the steps of:

calculating a speed of the moving object; and determining coordinates and/or rotation angles of the viewpoint also based on the calculated speed of the moving object.

8. A method according to claim 5, wherein said moving object moves over terrain whose three-dimensional coordinates have been established, further comprising the steps of:

calculating a gradient of the terrain below said moving object; and determining coordinates and/or rotation angles of the viewpoint also based on the calculated gradient.

9. A machine-readable recording medium which stores a computer program for controlling a computer to execute a process of displaying a pseudo-three-dimensional image of a continuously moving object as viewed from a moving view point said computer program comprising the steps of:

storing a history of coordinates and/or rotation angles of the continuously moving object;

determining coordinates and/or rotation angles of the moving viewpoint based on the stored history of coordinates and/or rotation angles of the continuously moving object; and generating and displaying a pseudo-three-dimensional image of the continuously moving object image as viewed from the moving viewpoint when the moving viewpoint is at the determined coordinates and/or at the continuously rotation angle; and inputting via a player-operated unit, changes in direction and/or rotational angles of said moving viewpoint into said viewpoint determining means such that the display control means substantially simultaneously effects a corresponding change in the generated and displayed image of the continuously moving object.

10. Apparatus for displaying an image of a continuously moving object comprising:

first means producing control signals to control the display of the image of a continuously moving object;

second means calculating changes in said produced control signals;

third means determining a present position and a present direction of movement of said continuously moving object based on said calculated changes in said produced control signals;

fourth means calculating a position of a moving viewpoint from which the continuously moving object is to be viewed and calculating a viewpoint direction from which the continuously moving object is to be viewed based on said present position and said present direction of movement of said moving object;

a display means displaying an image of the moving object based on said viewpoint position from which the moving object is viewed and based on said viewpoint direction from which the moving object is viewed and player-operated input means for inputting into said fourth means changes in direction and/or rotational angles of said moving viewpoint such that said fourth means effects a substantially simultaneously corresponding change in the generated and displayed image of the continuously moving object.

11. Apparatus according to claim 10 wherein said Player-operated input means includes a simulated aerial mechanism adapted to be operated by a player.

12. Apparatus according to claim 11 wherein said aerial mechanism includes a first control element operated by the player to effect changes in the direction of movement of the moving object and a second control element to effect changes in the direction in which the player views the moving object on the display means.

13. Apparatus according to claim 12 wherein said aerial mechanism includes a control element operated by the player to effect simulated tilting of the aerial device about an axis generally parallel to the direction of movement of the aerial mechanism.

14. Apparatus according to claim 12 wherein said second control element produces a variable signal depending on the displacement of the player's torso relative to the aerial mechanism.

15. A method of displaying an image of a continuously moving object as viewed from a continuously moving viewpoint comprising:

generating and displaying an image of a continuously moving object as viewed from a continuously moving viewpoint representing an imaginary camera position;

generating a change in the relative position between said continuously moving object and said continuously moving viewpoint; and changing the generated and displayed image of the continuous moving object substantially simultaneously with changes in relative position between said moving object and said moving viewpoint.

16. A method according to claim 15 wherein said step of generating said change in the relative position between said moving object and said moving viewpoint comprises generating a change in the relative linear distance between said moving object and said moving viewpoint.

17. A method according to claim 15 wherein said step of generating said change in the relative position between said moving object and said moving viewpoint comprises generating a change in the relative angle between said moving object and said moving viewpoint.

18. A method according to claim 15 wherein said step of generating said change in the relative position between said moving object and said moving viewpoint comprises generating a change in the relative linear distance and a change in the relative angle between said moving object and said moving viewpoint.

19. A method of displaying an image of a continuously moving object from a continuously moving viewpoint comprising the steps of:

producing control signals to control a display of a continuously moving object;

calculating changes in said produced control signals;

determining a present position and a present direction of movement of said moving object based on said calculated changes in said produced control signals;

calculating viewpoint positions of a continuously moving viewpoint from which the moving object is to be viewed and directions of said continuously moving viewpoint from which the moving object is to be viewed based on the said determined present position and said determined present direction of movement of said object; and displaying an image of the moving object based on said determined present position and said present direction of movement of the moving object and substantially simultaneously with changes in said calculated viewpoint position and said calculated viewpoint direction from which the moving object is viewed.

* * * * *